July 1, 1924.  
J. CONTE  
BOTTOMER FOR CANDY COATING MACHINES  
Filed Feb. 27, 1922
1,499,347
2 Sheets-Sheet 1
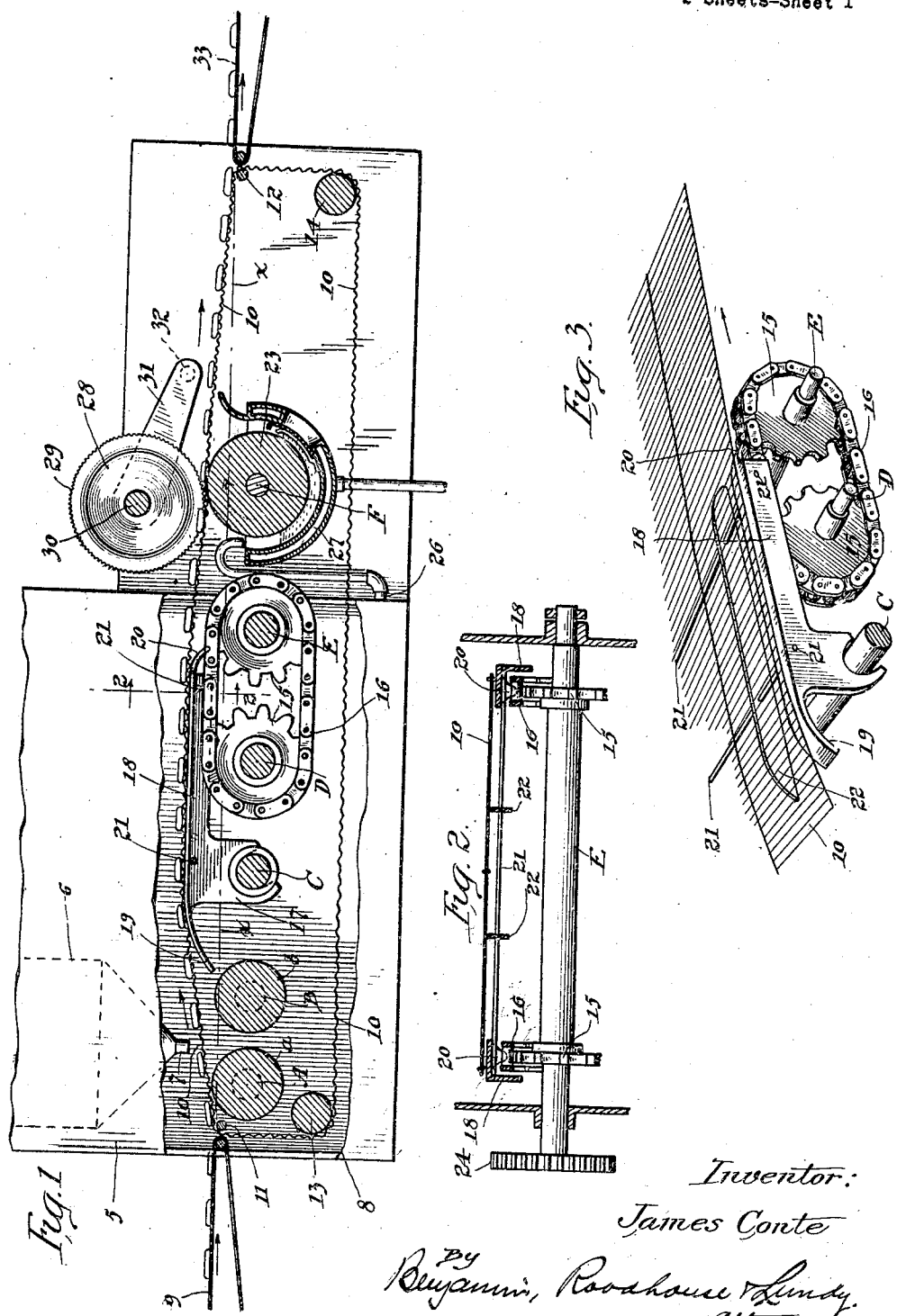
Inventor:  
James Conte  
By Benjamin, Roodhouse & Lundy  
Attys.

Patented July 1, 1924.

UNITED STATES PATENT OFFICE.

JAMES CONTE, OF BLOOMINGTON, ILLINOIS.

BOTTOMER FOR CANDY-COATING MACHINES.

Application filed February 27, 1922. Serial No. 539,597.

*To all whom it may concern:*

Be it known that I, JAMES CONTE, a citizen of the United States, residing at Bloomington, in the county of McLean and State of Illinois, have invented a new and useful Improvement in a Bottomer for Candy-Coating Machines, of which the following is a specification.

My invention relates to apparatus for automatically placing a coating of chocolate or other substance upon nuts, fondants, and other candy centers, and it has more particular reference to a structure for placing a bottom coating or layer of chocolate or the like upon the article being fed through what is commercially known as an "enrobing" machine.

In certain well-known types of enrobing machines the "center" or "filling", either nut or fondant cream is conveyed through the coating or dipping bath upon a wire belt or apron made up of a plurality of closely positioned transverse wires of relative small gauge arranged parallel with each other so as to provide a multitude of interstices in the belt or apron. The "centers" are disposed in somewhat symmetrically spaced positions upon this wire belt and as they pass under the stream of melted chocolate or other coating fluid the desired quantity of the coating adheres to the "centers" and a small quantity thereof will run to the undersides of the "centers" by capillarity. After passing the stream of coating fluid the wire belt carrying the coated articles is supported at spaced intervals by a plurality of spaced rollers or shafts disposed transversely to the path of travel of the belt until the coated articles are discharged from the main portion of the enrober machine. These supporting rollers or shafts have a tendency to and actually do scrape off or remove a quantity of the bottom coating from the articles by contact therewith and when the coated article is discharged from the apparatus the bottom coating is to a great extent removed, and not infrequently so far removed as to expose the nut or other filling which comprises the "center" of the candy, which renders the article undesirable and sometimes unsalable to confectioners. To overcome this inherent objection to the coating machines many candy manufacturers employing such automatic coating machines frequently hand coat the already machine coated articles, which of course places an additional expense upon the cost of manufacture.

It is to overcome the before-mentioned objections to the automatic coating machine or enrober that I have designed the structure herein disclosed, and it will therefore be obvious that the primary object of my invention is to eliminate the scraping off of the bottom coating of the machine dipped articles and to further this object I have also provided means for placing a supplemental or additional coating upon the bottoms of the articles passing through the enrobing machine.

Another object of my invention is to provide means whereby the "tails" or "streamers" usually formed at either or both ends of machine-coated articles may be eliminated, and to do this in a very simple and inexpensive manner and without altering the structure or operation of the usual enrobing machine.

I prefer to carry out my invention by means of the structure illustrated in the accompanying drawings that show a typical embodiment of my invention in connection with a well-known type of enrobing apparatus, but it will be understood that the structure illustrated and described herein may be modified to adapt it to other types of apparatus without departing from the principles forming the subject-matter of the appended claims. The accompanying drawings are in a sense merely diagrammatical for the purpose of illustration, and by referring thereto it will be seen that, Figure 1 is a vertical side elevation of my invention installed upon an enrobing machine, the latter being partly in section and broken away for clearness.

Figure 2 is a fragmental perspective of my invention with the upper portions of the enrobing machine above the mesh conveyor removed for clearness.

Figure 3 is a transverse section of the conveyor portion of my invention taken on line 3—3.

Figure 4:
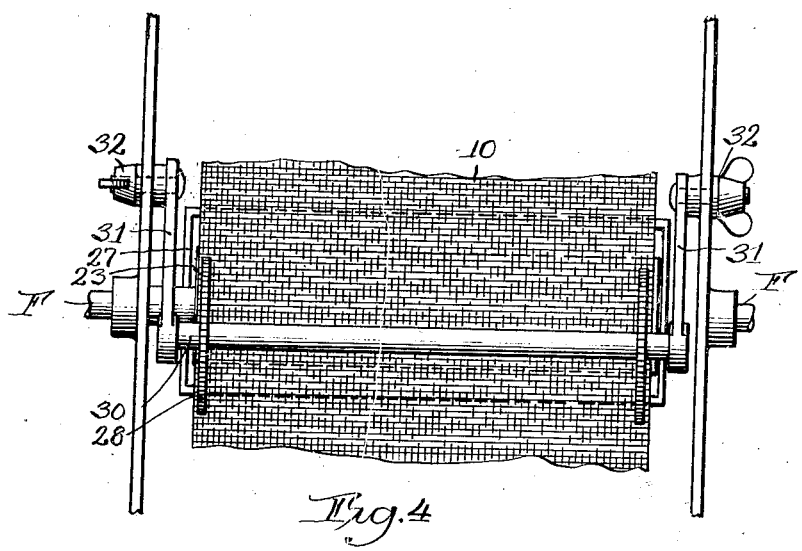
Fig. 4 is a top plan of the bottom coating cylinder and tension means for the conveyor.
Figure 5:
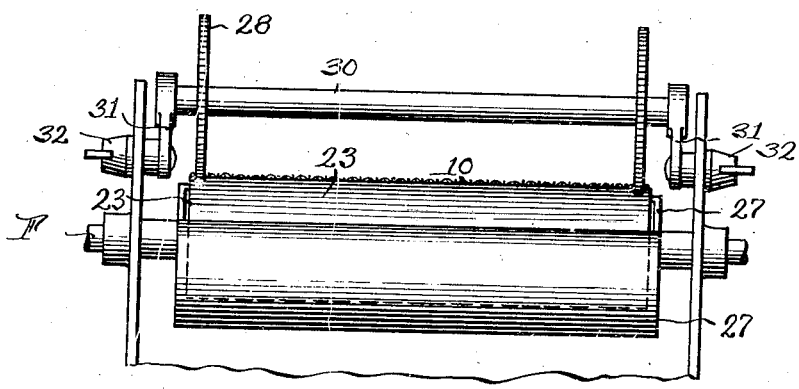
Fig. 5 is a front elevation of the structure shown in Fig. 4.

In the drawings, similar reference characters have been applied to the same parts wherever said parts appear in the divers view, and by first observing Figure 1 thereof it will be seen the enrober apparatus in so far as it is illustrated in the drawings includes the vertical or upright body portion 5 within which is provided a suitable reservoir 6 for containing the melted coating, and has a suitable discharge nozzle 7 in its lower portion through which the coating in a fluid form is distributed or "flooded" upon the centers or filling that are passing thereunder.

In the enrobing machines in general use a suitable receptacle 8 is provided below the discharge nozzle into which the surplus coating falls after leaving the centers and a pump is usually provided to return this surplus coating to the reservoir, but as this forms no portion of my present invention the same has not been shown and need only be incidentally mentioned herein. A longitudinally movable apron 9 is employed to convey the centers or fillings of the candy to be coated to the enrobing machine, which apron is preferably in the form of a canvas of woven fabric belt. Upon reaching the enrober the centers are transferred to a movable reticulated conveyor 10 that preferably is formed of a plurality of transversely disposed wires of small gauge suitably connected together in parallel relation to each other so that the surplus coating will readily fall from the wires and through the interstices in the conveyor. Small rollers 11 and 12 are provided transversely at opposite ends of the upper length of conveyor 10 and oppositely positioned rollers 13 and 14 are positioned, respectively, below rollers 11 and 12.

In the enrober machine there are usually provided in the receptacle 8 a plurality of transverse shafts A, B, C, D, E, and F, the first two shafts A and and B being adjacent each other below nozzle 7 and carrying cylinders $a$ and $b$ respectively, a portion of the peripheries thereof being immersed in the coating contained in receptacle 8 in order that a film of the coating will be carried into contact with the under portion of the conveyor 10. This arrangement is made in the enrober in an attempt to place a coating upon the bottom of the articles moving through the apparatus and it is intended by the manufacturers of such enrobers that the conveyer shall assume the path indicated by the broken line $x$. I have ascertained after considerable experience with such enrobers that the vibrations, provided for as the articles travel through the apparatus, together with contact with the supporting bars, will partially if not wholly remove this bottom coating before the articles reach the discharge end of conveyor 10. A vibration of the articles immediately after coating is desirable in order to shake off or remove the "tail" or to prevent the formation of the "tail," but I have found by my said experiments that this vibration usually removes a great quantity of the bottom coating and whatever is not removed in this manner is scraped off by contact with the supporting rollers for the mesh conveyor that are usually mounted on one or more of the shafts C, D, E, and F.

I have devised the structure shown in the drawings to overcome these inherent objections to the present enrobers whereby I am able to remove or prevent the formation of the "tail" and am successful in placing a bottom coating upon the articles that is much thicker than can be possibly attained through the use of the machines at present available.

To accomplish these objects I place sprockets 15 upon the transverse shafts D and E and connect said sprockets by chains 16. Upon shaft C I mount a vibrator or agitator structure that elevates the mesh conveyor 10 above the rollers on the shafts and which extends toward and is supported upon the chains 16. This structure preferably consists of cast brackets or supports extending substantially parallel with the chains 16 the ends of which brackets nearest the feed portion of the enrober being provided with yokes 17 or bifurcated lateral extensions 17 that snugly fit over the shaft C, and which in order to prevent their being inadvertently displaced with respect to said shaft have their bifurcations extended in planes oblique to the direction of travel of the conveyor. The horizontal portions of these supports are angle pieces 18 that are preferably integral with the extensions 17 and have the horizontal flange thereof at one end extended opposite the direction of travel of the conveyor 10 and curved downwardly toward roller $b$ to provide inclined horns 19. The vertical flanges of the pieces 18 are adjacent to but outside the chains 16 and parallel therewith so that the chains will provide means for preventing lateral or sidewise movement of the brackets and the ends of the horizontal flanges extending in the direction of movement of the conveyor and farthest from the shaft C are tapered and bent downwardly to provide fingers 20 that will ride between the links of the chains when the latter are in motion. The edges of the conveyor ride or move upon the upper surfaces of the horizontal flanges of the brackets and in order to provide support for the intermediate longitudinal portion of the conveyor I have connected the brackets by cross pieces 21 to which are secured longitudinally disposed bars 22. These bars are flat strap metal or the like set upon edge, and the upper edges thereof are shaped to conform substantially with the plane of the upper surface of the horizontal flange of the side brackets with which they are arranged parallel. These side brackets, together with the cross-pieces and intermediate straps form the support for elevating the conveyor 10 above the shafts and when the chains are in motion the fingers 21 of the side-brackets riding over the links of the chains will vibrate the support to such an extent that the surplus coating on the articles will be shaken off and avoid the formation of the "tail" upon the finished article.

In order to put a bottom coating upon the articles before they leave the machine, I have provided a cylinder 23 mounted upon the transversely disposed shaft F that is suitably journaled in the side-frame of the apparatus and which is driven by a gear 24 through suitable intermediary transmission, (not shown), which gear 24 derives its motion from one of the driven or driving gears of the apparatus, and rotating in a direction that will move the upper periphery of the cylinder 23 in the direction of travel of the conveyor 10 with which it contacts. Partially enclosing this cylinder is a trough 25 containing a quantity of the melted coating that is kept supplied thereto through pipe 26 by means of a suitable pump from the tank 8. A steam heater 27 maintains the coating in trough 25 at the desired temperature and the cylinder 23 rotating in this melted coating carries up a film of the coating which upon contacting the wire conveyor 10 adheres to the under surfaces or bottoms of the coated articles thus insuring a desired coating thereon.

For the purpose of keeping the wire conveyor 10 in contact with the upper segment of the cylinder 23 and for stopping the vibration thereof as herein described, I have provided oppositely arranged rotatable disks 28 having serrations 29 upon their peripheries to enter the interstices of the conveyor 10. These disks are mounted upon opposite end portions of a horizontal shaft 30 that is journalled in suitable bracket arms 31 adjustably pivoted in the side walls of the apparatus and after the desired pressure has been adjusted said arms are secured in position by tightening wing nuts 32 upon the spindles carrying said bracket arms. It will be noted the shaft 30 for disks 29 is slightly off-set or out of vertical alinement with respect to shaft F on which cylinder 23 is mounted. This is for the purpose of permitting the conveyor 10 to engage the serrated disks 28 before reaching the cylinder 23. This arrangement not only prevents the serrations picking up and becoming clogged with the coating but directs the conveyor to increased surface contact with the cylinder 23 and insures contact at all times and also eliminates the vibrations of the conveyor after it has engaged the disks. The coated articles are discharged from the conveyor 10 at roller 12 onto a fabric or similar apron 33 which usually is supplied with sheets of waxed paper which are removed by the operator and "racked" in the well-known manner to permit the coating to thoroughly harden before packing. The trough 25 is preferably jacketed as at 27 so that it may be kept warm and is provided with an interior door 35 near its bottom which will permit of draining the contents of the trough when cleaning the apparatus.

What I claim is—

1. The combination with an enrobing apparatus having a coating discharge nozzle and a reticulated conveyor movable past said nozzle, of an elevating frame comprising rails disposed longitudinally of said conveyor upon which said conveyor travels after leaving said nozzle, devices for vibrating said frame whereby said conveyor is agitated to remove the surplus coating from the articles thereon, a transverse cylinder below and supporting said conveyor after the latter leaves said frame, means for supplying said cylinder with a film of coating and devices for maintaining said conveyor in contact with said cylinder while passing the latter.

2. The combination with an enrobing apparatus having a coating discharge nozzle and a reticulated conveyor movable past said nozzle, of an elevating frame comprising rails disposed longitudinally of said conveyor upon which said conveyor travels after leaving said nozzle, devices for vibrating said frame whereby said conveyor is agitated to remove the surplus coating from the articles thereon, a transverse cylinder below and supporting said conveyor after the latter leaves said frame, a trough containing a quantity of coating in which a portion of said cylinder is immersed and devices for maintaining said conveyor in contact with said cylinder while passing the latter.

3. The combination with an enrobing apparatus having a coating discharge nozzle and a reticulated conveyor movable past said nozzle, of an elevating frame provided with rails arranged longitudinally of said conveyor upon which said conveyor travels after leaving said nozzle, devices for vibrating said frame whereby said conveyor is agitated to remove the surplus coating from the articles thereon, a transverse cylinder below and supporting said conveyor after the latter leaves said frame, a trough containing a quantity of coating in which a portion of said cylinder is immersed, rotatable disks contacting the edges of said conveyor prior to the engagement of the conveyor with the cylinder whereby the agitation of the conveyor is stopped, a transverse shaft upon which said disks are mounted and adjustable bracket arms in which said shaft is journaled.

4. In combination with a coating machine having a reticulated belt for conveying the articles to be coated, a frame having belt-supporting longitudinally arranged rails, which frame is pivoted to support said belt above its normal position of travel, sprocket chains upon which one end of said frame rides, a coating cylinder disposed posteriorly to said frame with relation to the travel of said belt and a tension device for holding said belt to said cylinder and stopping the vibration of said belt.

5. In combination with a coating machine having a reticulated belt, a frame pivoted to support said belt and vibrated at one end, said frame having longitudinally disposed belt-supporting rails, a coating cylinder disposed posteriorly to said frame with relation to the travel of said belt, and tension means for holding said belt to said cylinder and stopping the vibration of said belt.

6. In combination with a coating machine having a reticulated belt, a frame pivoted to support said belt and vibrated at one end, said frame having longitudinally disposed belt-supporting rails, a coating cylinder disposed posteriorly to said frame with relation to the travel of said belt, rotatable members engaging opposite edges of said belt, and means for adjusting the position of said members for holding said belt to said cylinder and stopping the vibration of said belt.

7. In combination with a coating machine having a reticulated belt, a frame pivoted to support said belt and vibrated at one end, said frame having longitudinally disposed belt-supporting rails, a coating cylinder disposed posteriorly to said frame with relation to the travel of said belt, rotatable members engaging opposite edges of said belt and pivoted adjustable arms upon which said members are supported, whereby said belt is held against said cylinder and the vibration thereof is stopped.

8. In combination with a coating machine having a reticulated belt, a frame pivoted to support said belt and vibrated at one end, a coating cylinder disposed posteriorly to said frame with relation to the travel of said belt, rotatable disks engaging opposite edges of said belt, a shaft on which said disks are mounted, and adjustable tension arms to which said shaft is operatively connected.

Signed at Bloomington, county of McLean and State of Illinois, this 22 day of February, 1922.

JAMES CONTE.

Witnesses:
PAUL O. BEICH,
ALBERT C. BEICH.